United States Patent
Biedermann et al.

(10) Patent No.: US 6,397,069 B1
(45) Date of Patent: *May 28, 2002

(54) PROCEDURE FOR CONTROLLING THE SET-UP OF CALLS WITH TRANSMISSION CHANNEL REQUIREMENT OF DIFFERENT NETWORK TERMINATIONS

(75) Inventors: Rolf Biedermann, Ahaus; Martin Kordsmeyer, Hörstel; Olaf Dicker, Rees, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/230,792

(22) PCT Filed: Sep. 9, 1997

(86) PCT No.: PCT/DE97/02004

§ 371 (c)(1),
(2), (4) Date: Aug. 2, 1999

(87) PCT Pub. No.: WO98/10633

PCT Pub. Date: Mar. 19, 1998

(30) Foreign Application Priority Data

Sep. 10, 1996 (DE) .......................... 196 36 758

(51) Int. Cl.[7] .................................. H04Q 7/20

(52) U.S. Cl. ................. 455/450; 455/445; 455/428

(58) Field of Search .................. 455/450, 414, 455/426, 424, 422, 462, 463, 509, 557, 554, 555, 445, 428

(56) References Cited

U.S. PATENT DOCUMENTS

| 5,305,308 | A | * | 4/1994 | English et al. ............ 370/32.1 |
| 5,533,027 | A | * | 7/1996 | Akerberg et al. ......... 370/195.1 |
| 5,590,400 | A | * | 12/1996 | Lopponen ................. 455/34.2 |
| 5,727,160 | A | * | 3/1998 | Ganesan et al. ........ 395/200.79 |
| 5,745,484 | A | * | 4/1998 | Scott ........................ 370/347 |
| 5,799,010 | A | * | 8/1998 | Lomp et al. ............... 370/335 |
| 5,805,633 | A | * | 9/1998 | Uddenfeldt ................ 375/202 |
| 5,926,755 | A | * | 7/1999 | Ghisler ..................... 455/414 |
| 5,966,668 | A | * | 10/1999 | Lindroth ................... 455/555 |

FOREIGN PATENT DOCUMENTS

| DE | 195 45 767 A1 | 6/1996 |
| DE | 196 25 141 C2 | 10/1997 |
| DE | 196 25 142 A1 | 10/1997 |
| WO | WO 93/21719 | 10/1993 |
| WO | WO 96/39001 | 12/1996 |

OTHER PUBLICATIONS

European Telecommunication Standard, ETS 300–175–3, Medium Access Control Layer, Oct. 1992.*
Siemens, DECTlink Radio Access: where performance counts, 1996.*
TEC–ASCOM Technical Magazine, No. 1, (1996), N. Piquet, "DECT/RLL access systems for neighbourhood telephony", pp. 10–14.

(List continued on next page.)

Primary Examiner—Daniel Hunter
Assistant Examiner—Charles Chow
(74) Attorney, Agent, or Firm—Bell Boyd & Lloyd LLC

(57) ABSTRACT

In order to be able to control the setting up of telecommunication connections efficiently and reliably in telecommunication subsystems serving as local message transmission loops of telecomunication systems and having network terminations which differ with regard to the transmission channel requirements, a first network termination specifies explicitly, for example in the form of a parameter, the requested transmission channel desired by it in a connection, set-up message of the network termination to the remote station in the telecommunication subsystem.

14 Claims, 3 Drawing Sheets

OTHER PUBLICATIONS

TELCOM Report International, (1996), vol. 19, No. 5–6, M. Katruff, "ISDN . . . on radio in the local loop near you", pp. 34–37.

IEEE Communications Magazine, Jan. 1995, David D. Falconer et al, Time Division Multiple Access Methods for Wireless Personal Communications, pp. 50–57.

Nachrichtentech, Elektron, Berlin, vol. 45 (1995), Roland Geissler, Drahtlose ISDN–Kommunikation, pp. 21–23 (No translation).

IEE Colloquium 1993, 173; W. Hing et al, "Cordless Access to the ISDN Basic Rate Service", pp. 29/1–29/7.

Nachrichtentech, Elektron, Berlin, vol. 41, (1991) Werner Baerwald, "Schnittstellen in der Tele–kommunikation Teil 1: Standardisierung in der Telekommunikation—ein Überlick", pp. 99–102; Teil 2: pp. 138–143; Teil 3:pp. 179–182; Teil 3 (Schluβ): pp. 219–222; Teil 4: pp. 19–20; Teil 5: pp. 59–61; Teil 5 (Schluβ): pp. 99–102; Teil 6: pp. 150–153; Teil 7: pp. 238–241; Teil 8: pp. 29–33; Teil 9: pp. 95–97; Teil 9: pp. 129–135; & Teil 10: pp. 187–190 (No translation).

DECT/GAP standard (Digital European Cordless Telecommunication: cf. (1): Nachrichtentechnik Elektronik 42 (1992) Jan./Feb. No. 1, Berlin, DE; U. Pilger "Struktur des DECT–Standards," pp. 23–29.

ETSI—Publication, Oct. 1992, ETS 300175 1 . . . 9, Part 1: Overview, pp. 1–30; Part 2: Physical layer pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

Telcom Report 16 91993), No. 1, J. H. Koch: "Digitaler Komfort für schnurlose Telekommunikation—DECT–Standard eröffmet neue Nutzungsgebiete", pp. 26–27 (No translation).

tec 2/93—Das technische Magazin von Ascom "Wege zur universellen mobilen Telekommunikation", pp. 35 to 42 (No translation).

Philips Telecommunication Review, vol. 49, No. 3, (1991), R. J. Mulder, "DECT, a universal cordless access system", pp. 68–73.

ETSI—Publication, Apr. 1995, prETS 300444, Generic Access Profile, pp. 1–129.

Informatik Spektrum 14, Jun. 1991, No. 3, Berlin, A. Mann, "Der GSM–Standard—Grundlage für dugutake europäische Mobilfunknetze", pp. 137–152 (No translation).

Siemens (1996), Public Communication Networks Group, Access Networks, DECTlink Radio Access: Where Performance Counts, pp. 1–16.

* cited by examiner

PROCEDURE FOR CONTROLLING THE SET-UP OF CALLS WITH TRANSMISSION CHANNEL REQUIREMENT OF DIFFERENT NETWORK TERMINATIONS

In telecommunication systems having a message transmission route between a message source and a message sink, transmitting and receiving devices are used for message processing and transmission, in which
1) the message processing and message transmission can be carried out in a preferred transmission direction (simplex operation) or in both transmission directions (duplex operation),
2) the message processing is analogue or digital,
3) the message transmission is wire-based over the trunk transmission route, or is carried out wire-free on the basis of various message transmission methods FDMA (Frequency Division Multiple Access), TDMA (Time Division Multiple Access) and/or CDMA (Code Division Muiltiple Access)—for example in accordance with radio standards such as DECT, GSM, WACS or PACS, IS-54, PHS, PDC, etc. [cf. IEEE Commications Magazine, January 1995, pages 50 to 57; D. D. Falconer et al.: "Time Division Multiple Access Methods for Wireless Personal Communications"].

"Message" is a generic term which covers both the useful content (information) and the physical representation (signal). Despite a message having the same useful content—that is to say the same information—different signal forms may occur. Thus, for example, a message relating to an object may be transmitted
(1) in the form of an image,
(2) as the spoken word,
(3) as the written word,
(4) as an encrypted word or image.

The type of transmission in accordance with (1) . . . (3) is in this case normally characterized by continuous (analogue) signals, while in the case of the transmission type according to (4), the signals are normally discontinuous (for example pulses, digital signals).

On the basis of this general definition of a message system, the invention relates to a method for controlling the setting up of telecommunication connections in telecommunication subsystems serving as local message transmission loops of telecommnication systems and having network terminations which differ with regard to the transmission channel requirements, in particular "ISDN/PSTN⇌DECT-specific RLL/WLL" systems, in accordance with the preamble of Patent Claim 1.

Using as references the documents "Nachrichtentechnik Elektronik [Telecommunications Electronics], Berlin 45 (1995) Issue 1, pages 21 to 23 and Issue 3, pages 29 and 30" as well as IEE Colloquium 1993, 173; (1993), pages 29/1–29/7; W. Hing, F. Halsall: "Cordless access to the ISDN basic rate service", and on the basis of a DECT/ISDN Intermediate Systems DIIS according to ETSI publication prETS 300xxx, Version 1.09, Jul. 31, 1996, FIG. 1 shows an "ISDN⇌DECT-specific RLL/WLL" Telecommunication System IDRW-TS (Integrated Services Digital Network⇌Radio in the Local Loop/Wireless in the Local Loop) with an ISDN telecommunication subsystem [cf. document "Nachrichtentechnik Elektronik [Telecommunications Electronics], Berlin 41–43, Parts: 1 to 10, Part 1: (1991) Issue 3, pages 99 to 102; Part 2: (1991) Issue 4, pages 138 to 143; Part 3: (1991) Issue 5, pages 179 to 182 and Issue 6, pages 219 to 220; Part 4: (1991) Issue 6, pages 220 to 222 and (1992) Issue 1, pages 19 to 20; Part 5: (1992) Issue 2, pages 59 to 62 and (1992) Issue 3, pages 99 to 102; Part 6: (1992) Issue 4, pages 150 to 153; Part 7: (1992) Issue 6, pages 238 to 241; Part 8: (1993) Issue 1, pages 29 to 33; Part 9: (1993) Issue 2, pages 95 to 97 and (1993) Issue 3, pages 129 to 135; Part 10: (1993) Issue 4, pages 187 to 190;"] and a DECT-specific RLL/WLL Telecommunication Subsystem RW-TSS.

The DECT/ISDN Intermediate System DIIS and the RLL/WLL telecommunication subsystem RW-TSS are in this case preferably based on a DECT/GAP system DGS [Digital Enhanced (previously: European) Cordless Telecommunication; cf. (1): Nachrichtentechnik Elektronik 42 (1992) January/February No. 1, Berlin, DE; U. Pilger "Struktur des DECT-Standards" [Structure of the DECT standard], pages 23 to 29 in conjunction with the ETSI publication ETS 300175-1 . . . 9, October 1992; (2): Telecom Report 16 (1993), No. 1, J. H. Koch: "Digitaler Komfort für schnurlose Telekommunikation—DECT-Standard eröffnet neue Nutzungsgebiete" [Digital convenience for cordless telecommunication—DECT standard opens up new fields of applications], pages 26 and 27; (3): tec 2/93—Das technische Magazin von Ascom "Wege zur universellen mobilen Telekommunikation" [The technical magazine from Ascom "Means for universal mobile telecommunication"], pages 35 to 42; (4): Philips Telecommunication Review Vol. 49, No. 3, September 1991, R. J. Mulder: "DECT, a universal cordless access system"; (5): WO 93/21719 (FIGS. 1 to 3 with associated description)]. The GAP standard (Generic Access Profile) is a subset of the DECT standard which has the task of ensuring interoperability of the DECT radio interface for telephone applications (cf. ETSI publication prETS 300444, April 1995).

The DECT/ISDN Intermediate system DIIS and the RLL/WLL telecommunication subsystem RW-TSS can alternatively be based on a GSM system (Groupe Spéciale Mobile or Global System for Mobile Communication; cf. Informatik Spektrum 14 (1991) June, No. 3, Berlin, DE; A. Mann: "Der GSM-Standard—Grundlage für digitale europäische Mobilfunknetze" [The GSM standard—Basis for digital European mobile radio networks], pages 137 to 152). Instead of this, it is also possible in the context of a hybrid telecommuication system for the ISDN telecommunication subsystem I-TSS to be designed as a GSM system or PSTN system (Public Switched Telecommunication Network).

Furthermore, further possible ways for realizing the DECT/ISDN Intermediate System DIIS, the RLL/WLL telecommunication subsystem RW-TSS or the ISDN telecommunication subsystem I-TTS include the systems mentioned in the introduction as well as future systems which are based on the known multiple access methods FDMA, TDMA, CDMA (Frequency Division Multiple Access, Time Division Multiple Access, Code Division Multiple Access) and hybrid multiple access methods formed from them.

The use of radio channels (for example DECT channels) in classical cable-based telecommunication systems, such as ISDN, is becoming increasingly important, particularly against the background of future alternative network operators without their own complete cable network.

Thus, for example in the case of the RLL/WLL telecommunication subsystem RW-TSS, the wire-free connection technology RLL/WLL (Radio in the Local Loop/Wireless in the Local Loop) for example including the DECT system DS, ISDN services should be made available to the ISDN subscriber on standard ISDN interfaces (cf. FIG. 1).

In the "ISDN⇌DECT-specific RLL/WLL" telecommunication system IDRW-TS according to FIG. 1, a telecommunication subscriber (user) TCU (Tele-Communication User) with terminal TE (Terminal Endpoint; Terminal Equipment), is included in the ISDN world, with the services available in it, for example via a standardized S interface (S-BUS), the DECT/ISDN Intermediate System DIIS, which is designed as a local message transmission loop—is preferably DECT-specific and is contained in the RLL/WLL telecommunication subsystem RW-TSS—(first telecommunication subsystem), a further standardized S interface (S-BUS), a Network Termination NT and a standardized U interface of the ISDN telecommunication subsystem I-TTS (second telecommnication subsystem).

The first telecommunication subsystem DIIS essentially comprises two telecommunication interfaces, a first telecommunication interface DIFS (DECT Intermediate Fixed System) and a second telecommunication interface DIPS (DECT Intermediate Portable System), which are connected to one another without wires, for example via a DECT radio interface. Because of the quasi-position-based first telecommunication interface DIIS, the first telecommunication subsystem DIIS forms the local message transmission loop defined above in this context. The first telecommuication interface DIFS contains a Radio Fixed Part RFP, an Inter-Working Unit IWU1 and an INterface Circuit INC1 for the S interface. The second telecommunication interface DIPS contains a Radio Portable Part RPP and an InterWorking Unit IWU2 and an INterface Circuit INC2 for the S interface. The radio fixed part RFP and the radio portable part RPP in this case form the known DECT/GAP system DGS.

Taking the "ISDN⇆DECT-specific RLL/WLL" telecommunication system IDRW-TS with the RLL/WLL telecommunication subsystem RW-TSS according to FIG. 1 as a departure point, FIG. 2 shows a typical RLL/WLL scenario. The wire-free connection technology RLL/WLL (Radio in the Local Loop/Wireless in the Local Loop) for example including a DECT system is intended to make ISDN/PSTN services available to an ISDN/PSTN subscriber on standard ISDN/PSTN interfaces in the present case. The use of radio channels (for example DECT channels) in classical cable-based telecommunication systems, such as ISDN/PSTN, is becoming increasingly important, particularly against the background of future alternative network operators without their own complete cable network.

The RLL/WLL scenario illustrated comprises, for example, the currently commercially available Siemens DECT Link system Version 1 (DECT Link V1) and the DECT Link systems Versions 2 and 3 (DECT Link V2, DECT Link V3) which can be derived from Version 1 by further development.

A Radio Network Termination with an analogue a/b connection is employed in the abovementioned, known DECT Link V1 system. One refers to a radio network termination RNT-1 in this case. The radio network termination RNT-1 has a radio connection to a radio base station RBS1 . . . RBS3, for example the radio base station RBS3. The radio network termination RNT-1 requires a maximum of one user information channel (Traffic Channel). The data on this traffic channel are generally ADPCM voice-encoded at 32 kbit/s. The consequence of using a voice encoder is that maximum data rates (for example of modems or fax machines) of 9.6 kbit/s can be transmitted only inadequately via a 32 kbit/s DECT channel. Moreover, the 9.6 kbit/s can only be achieved under optimum conditions.

It is furthermore possible to employ a radio network termination with "n" analogue a/b connections. A radio network termination RNT-4 with four a/b connections was introduced in the DECT Link system Version 2 (DECT Link V2). The RNT-4 requires a maximum of up to four user information channels (Traffic Channels) simultaneously. In the case of the radio network termination RNT-4, these user information. channels were generally ADPCM-encoded, as in the case of the radio network termination RNT-1. In order, however, to relieve the load on the DECT radio interface, it is possible, in the case of the DECT Link V2, to operate the individual connections for the radio network termination RNT-4 via different radio base stations RBS (for examiple the three radio base stations RBS1 . . . RBS3). In the case illustrated, the radio network termination RNT-4 is connected, for example, to the radio base station RBS1. The setting up of connections is in this case carried out by a Radio Distribution Unit RDU. A base station control device RBC (Radio Base station Controller) is provided between the radio distribution unit RDU and the individual radio base stations. The base station control device RBC is a pure "layer 1" module. It demultiplexes the data of the radio distribution unit and matches them to the interface to the respective radio base station. The radio base station transmits the data via the DECT radio interface to the radio network termination (RNT-4).

The transmission rate that is available in the abovementioned DECT Link systems is inadequate for an ISDN subscriber connection. Specifically, 64 kbit/s with defined bit error rates are required per B channel for ISDN.

In order to be able to optimally utilize the DECT channel capacity, it is necessary to distinguish between voice transmission and data transmission. More DECT channels must be made available for data transmission than for voice transmission.

The 64 kbit/s LU7 service for data transmission via DECT is defined in the ETSI publication prETS 300434-1; January 1996 (DECT and ISDN Inter Working For End System Configuration). The data rate is oriented towards the ISDN B channel.

The ETSI publication prETS 300xxx; Version 1.09; Jul. 31, 1996 (DECT/ISDN Inter Working for Intermediate System Configuration) describes the transmission of an ISDN interface via the DECT radio chanmel. In this case, a conversion of the ISDN D channel protocol via the IWU protocol layer (Inter Working Unit) to the DECT protocol takes place in a Radio Fixed Part and a Radio Portable Part in the DECT-specific RLL/WLL system (cf. DE Patent Applications 19625142.7 and 19625141.9). The protocol data are transmitted in the C plane e.g. in the $C_f$ signalling channel via the DECT radio channel. The ISDN connection is subsequently made available again at an ISDN-specific radio network termination, designated as $RNT_i$.

These considerations have led to the DECT Link system Version 3 (DECT Link V3). The DECT Link V3 system has, for example, a DECT-specific radio network termination $RNT_i$ with ISDN capability for a terrestrially connectable ISDN terminal TE (Terminal Endpoint) and/or a terrestrially connectable ISDN Private Automatic Branch Exchange PABX as well as a data service-supporting, DECT-specific radio network termination $RNT-n_d$ with e.g. "n=4" a/b connections for data transmission for terrestrially connectable data terminals. The radio network terminations $RNT_i$, $RNT-n_d$ are connected via a DECT radio interface, having a plurality of radio channels, for example to the three radio base stations RBS1 . . . RBS3.

Consequently, in the case of the radio network termination $RNT-n_d$, once again a maximum of four user information channels (Traffic Channels) would be simultaneously possible. In the case of the radio network termination $RNT_i$, it would be two user information channels (2 B channels) and one signalling channel (D channel).

As in the case of the DECT Link V2 system, it is again possible in the DECT Link V3 system to operate the various user information and signalling channels via different radio base stations RBS1 . . . RBS3 for the purpose of uniform capacity utilization of the DECT radio channel.

Unlike the DECT Link V2 system, two different DECT transmission paths (bearers) are supported in the DECT Link V3 system, the 32 kbit/s ADPCM-encoded voice service and the 64 kbit/s LU7 data service. In contrast to the voice service, the data service requires two DECT time slots.

In the case of the radio network terminations $RNT_i$, $RNT-n_d$, a distinction is made between the transmission of voice data and, for example, modem data, in order to be able to better utilize the DECT channel capacity. For voice connections, in general only connections with 32 kbit/s ADPCM-encoded channels are set up. For data transmissions, channels with the 64 kbit/s LU7 data service are set up.

In principle, the number of respective radio network terminations $RNT_i$, $RNT-n_d$ and the number of radio base stations RBS1 . . . RBS3 can be freely selected; it will, however, preferably depend on the installation location of the "ISDN/PSTN⇌DECT-specific RLL/WLL" telecommunication system (keyword: network planning).

The radio network terminations RNT-1, RNT-4, $RNT_i$, $RNT-n_d$ and the radio base stations RBS1 . . . RBS3 form the DECT-specific RLL/WLL telecommunication subsystem RW-TSS and the RLL/WLL scenario. The RLL/WLL telecommunication subsystem RW-TSS is connected, on the network termination side, to the said cable-based terminals and, on the network side, as already mentioned, via a base station control device RCB and a radio distribution unit RDU to the ISDN/PSTN telecommuication system ISDN, PSTN (ISDN/PSTN network). There is a system channel SYC on which system messages SYM are transmitted, between the ISDN/PSTN telecommuication system ISDN, PSTN and the radio distribution unit RDU. The system messages SYM in this case contain, for example, ISDN signalling messages and/or ISDN/PSTN user messages. There are subsystem channels SSC on which the system messages SYM and subsystem messages SSM are transmitted, between the radio base stations RBS1 . . . RBS3 and the base station control device RBC, on the one hand, and between the radio base stations RBS1 . . . RBS3 and the radio network terminations RNT-1, RNT-4, $RNT_i$, $RNT-n_d$, on the other hand. The subsystem channels SSC contain, on the one hand, subsystem channels $SSC_{nts}$ on the network termination side, which correspond to the radio channels, and subsystem channels $SSC_{ns}$ on the network side.

An ISDN connection is made available to the subscriber by the radio network termination $RNT_i$. For this purpose, the radio network termination $RNT_i$ can request either on the C plane a $C_f$ channel (f=fast) for the transmission of signalling data or on the U plane a user data channel with a capacity of 32 kbit/s or 64 kbit/s via the DECT radio interface from the network side.

Four subscribers are respectively provided with one connection with data capability by the radio network termination $RNT-n_d$.

For this purpose, the radio network termination $RNT-n_d$ can likewise request a user data channel with a capacity of 32 kbit/s or 64 kbit/s via the DECT radio interface from the network side.

A specific channel resource (first channel of the subsystem channels on the network side) is necessary for routing the $C_f$ channel on the terrestrial side (between radio base station and radio distribution unit). The number of first channels between the radio base station and the radio distribution unit is preferably limited. In the present case, there are four first channels, for example.

A further—in the present case unlimited—channel resource is necessary for the routing of the user data channel on the terrestrial side (between radio base station and radio distribution unit).

For the transmission of theme chapels, a connection is set up via the DECT radio interface in the telecommunication subsystem, more precisely the radio base station and the radio network termination, in each case on the MAC protocol layer with a "B field set-up procedure for advanced connections" (cf. ETSI Publication ETS 300175-3, October 1992, Chapter 7.3, in particular is Chapter 7.3.3).

As a result of the restricted number of first channels, a radio base station is not allowed to permit the setting up of more than four MAC connections to a respective $C_f$ channel for signalling.

However, the DECT radio interface does permit the reception of a fifth set-up request for a MAC connection.

The problem therefore consists in the fact that
1) more channel resources ($C_f$ channels) are available via the DECT radio interface than can be covered on the terrestrial side,
2) the user data channel of the radio network termination $RNT-n_d$ with the capacity of 32 kbit/s cannot be distinguished from the $C_f$ channel using the "B field set-up procedure for advanced connections".

The user data channel of the radio network termination $RNT_i$ with the capacity of 32 kbit/s can be distinguished from the $C_f$ channel of the radio network termination $RNT_i$ using the transmission path parameter "LCN" (Logical Connection Number).

One suggested solution to the problem is based on the evaluation of the transmission path parameter "LCN" and of the parameter "PMID" (Portable MAC IDentifier) of the MAC message "BEARER_REQUEST" (cf. ETSI Publication ETS 300175-3, October 1992, Chapter 7.3.3.2). Using these parameters, the radio base station would enquire of the radio distribution unit whether the requested channel is a $C_f$ channel.

The radio distribution unit manages the request data and can thus unambiguously identify the requested channel using the parameters "PMID" and "LCN".

This solution is impractical because the connection set-up times would become unacceptably long due to the telecommunication between radio base station and radio distribution unit.

SUMMARY OF THE INVENTION

The object on which the invention is based consists in enabling the setting up of telecomunication connections to be controlled efficiently and reliably in telecommunication subsystems serving as local message transmission loops of telecommuication systems and having network terminations which differ with regard to the transmission channel requirements, in particular "ISDN/PSTN⇌DECT-specific RLL/WLL" systems.

The idea on which the invention is based consists in controlling the setting up of telecommunication connections in telecommunication subsystems serving as local message transmission loops of telecommunication systems and having network terminations which differ with regard to the transmission channel requirements, of the type mentioned in the introduction, in such a way that a first network termination specifies explicitly, for example in the form of a parameter, the requested transmission channel desired by it in a connection set-up message of the network termination to the remote station in the telecommunication subsystem.

As a result, the remote station can—particularly when the channels requested by the network terminations are identical with regard to the transmission capacity—on the one hand distinguish between the network terminations and, on the other hand, accordingly assign the respectively requested channel to the network terminations.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

DESCRIPTION OF THE PREFERRED EMBODIMENTS

Figure 1:
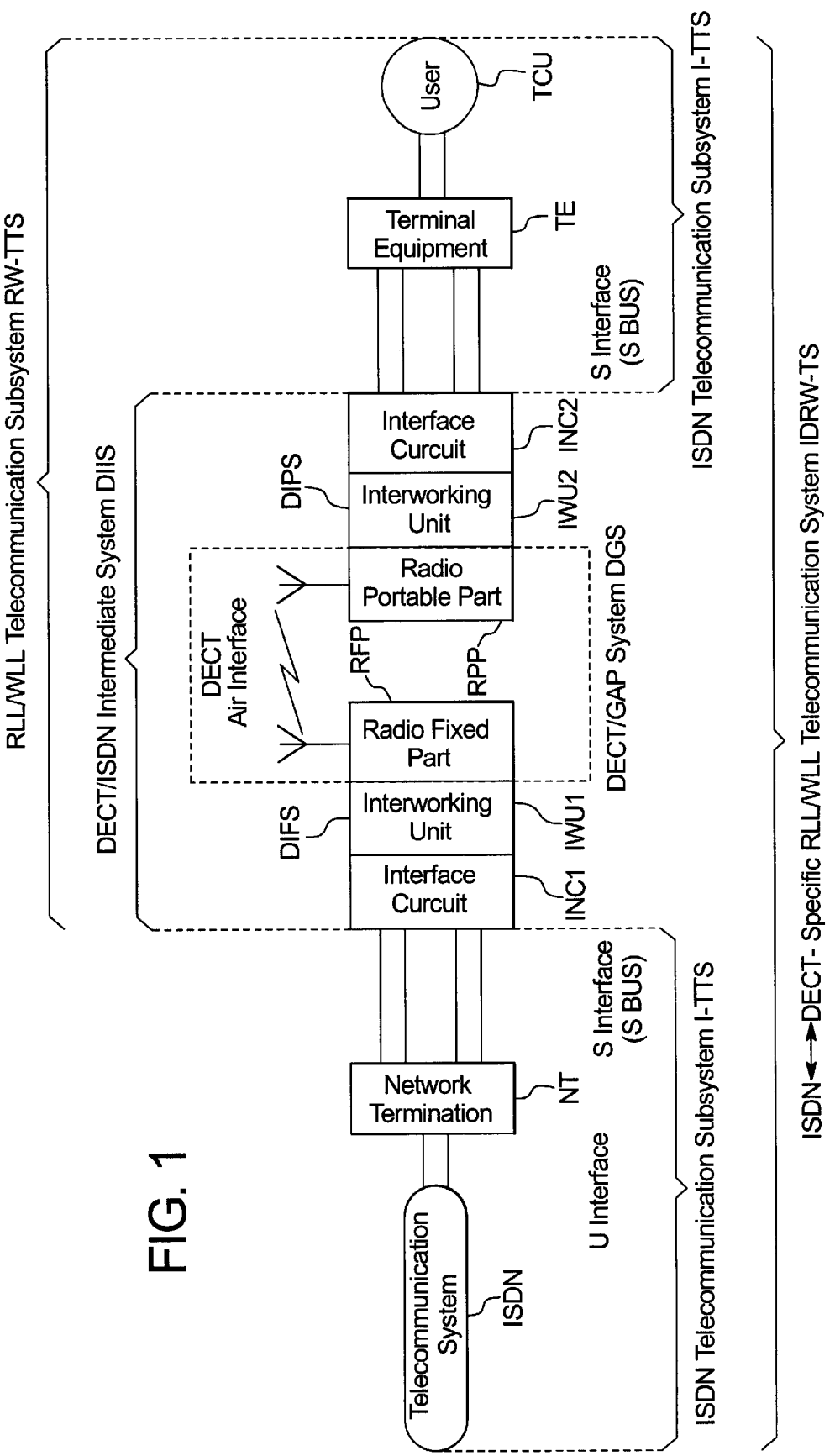
FIG. 1 depicts prior art related to the present invention.
Figure 2:
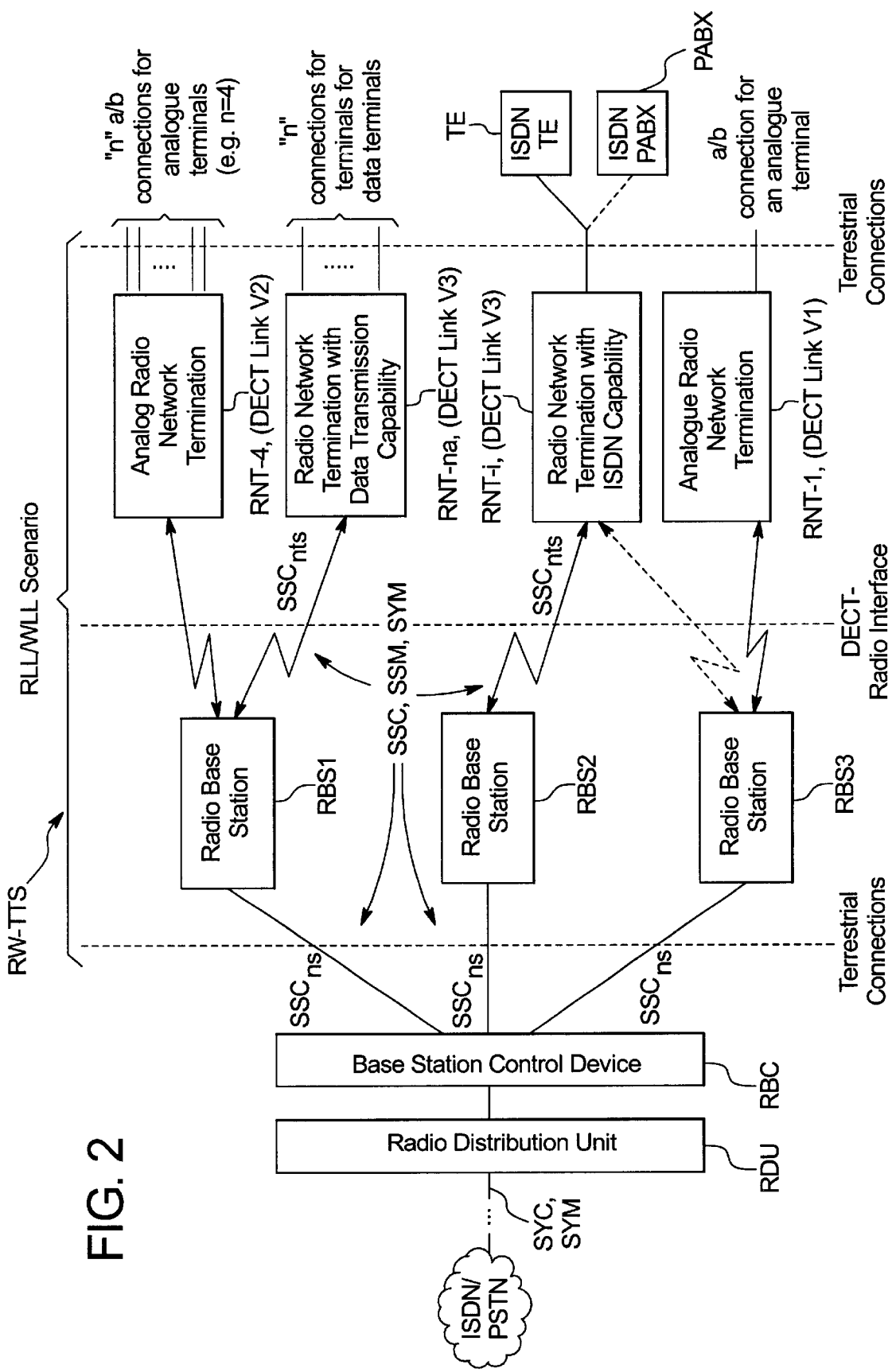
FIG. 2 depicts the method of the present invention.
Figure 3:
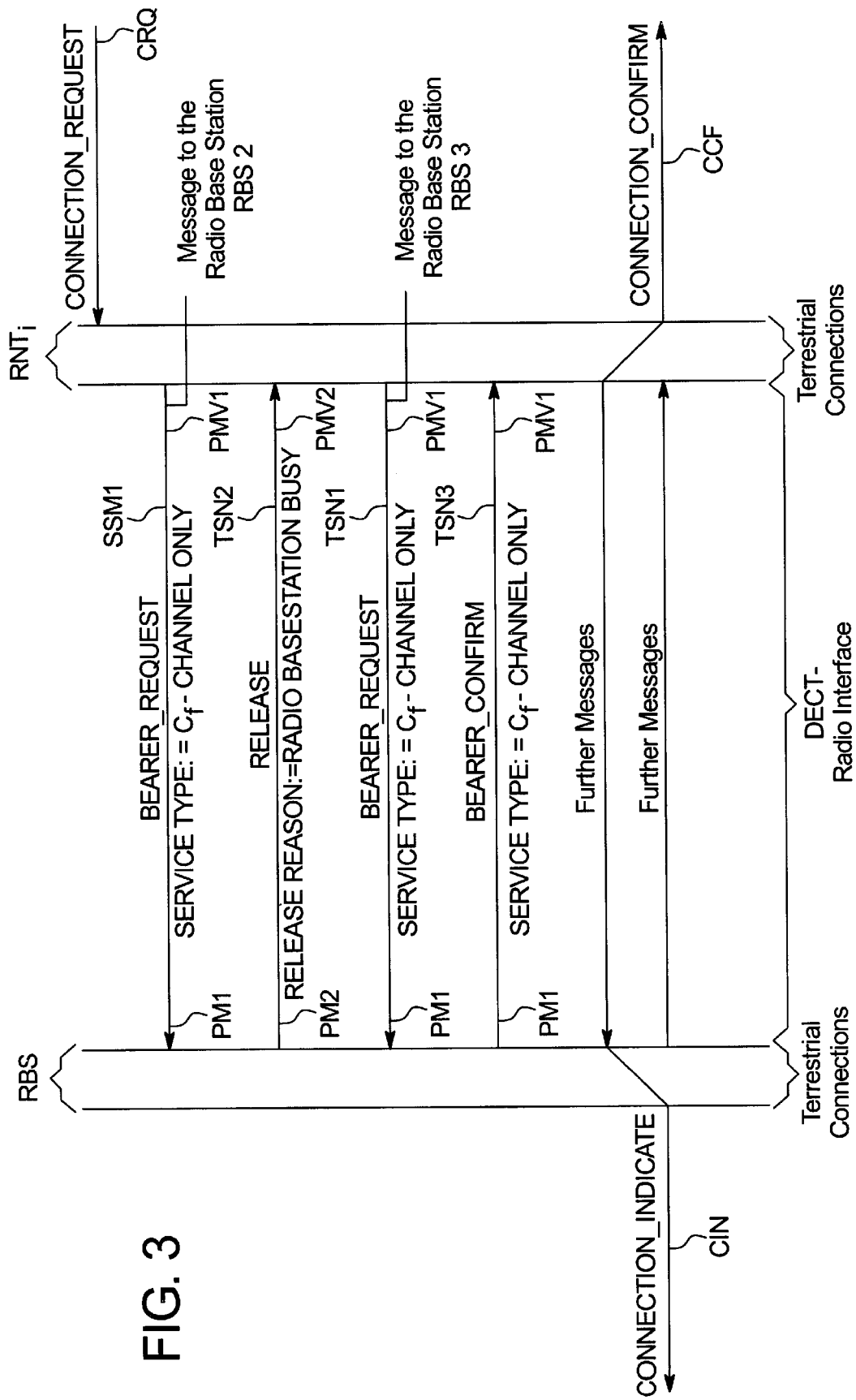
FIG. 3 further depicts the present invention.

FIG. 3 uses a stimulus state diagram to show how it is possible to control the respective setting up of telecommunication connections efficiently and reliably in telecommunication subsystems serving as local message transmission loops of telecommunication systems and having network terminations which differ with regard to the transmission channel requirements, in particular "ISDN/PSTN⇌DECT-specific RLL/WLL" systems.

The radio network termination $RNT_i$ sends to the radio base station RBS2 the connection set-up request after reception of a MAC message "CONNECTION_REQUEST" CRQ (cf. ETSI Publication ETS 300175-3, October 1992, Chapter 8, 8.1, 8.1.1) with a first subsystem message SSM1, corresponding to the MAC message "BEARER_REQUEST" (cf. ETSI Publication ETS 300175-3, October 1992, Chapter 7.3.3.2), via the DECT radio interface. This subsystem message SSM1 contains a first parameter "SERVICE TYPE" having a first parameter value "$C_f$-CHANNEL ONLY".

The radio base station RBS2 recognizes from the first parameter value that the radio network termination RNT, would like to set up the connection, and it recognizes in particular that on the terrestrial side, a first channel of the subsystem channels $SSC_{ns}$ on the network side is required for connecting the signalling channels to the system channels SYC and/or for the routing of the signalling channels of the telecommunication subsystems RW-TSS to the telecomnication systems ISDN, PSTN (a restricted channel resource).

If the radio base station RBS2 cannot make the required channel resource available because all of the first channels are busy, the connection request is rejected in that the radio base station RBS2 transmits a second subsystem message SSM2, corresponding to the MAC message "RELEASE" (cf. ETSI Publication ETS 300175-3, October 1992, Chapter 7.3.3.10) to the radio network termination $RNT_i$. The second subsystem message SSM2 indicates the reason for rejecting the connection by means of a second parameter "RELEASE REASON" contained in the subsystem message SSM2 and having a second parameter value "RADIO BASE STATION BUSY".

The radio network termination $RNT_i$ thereupon repeats the above-described connection request procedure with a different radio base station, for example the radio base station RBS3.

Since the radio base station RBS3 can make the required channel resource available because at least one first channel is free, the connection request is accepted in that the radio base station RBS3 transmits a third subsystem message SSM3, corresponding to the MAC message "BEARER_CONFIRM" (cf. ETSI Publication ETS 300175-3, October 1992, Chapter 7.3.3.3), to the radio network termination $RNT_i$. Still further messages are then transmitted between the radio base station RBS3 and the radio network termination $RNT_i$, until the radio base station RBS3 sends a MAC message "CONNECTION_INDICATE" CIN (cf. ETSI Publication ETS 300175-3, October 1992, Chapter 8, 8.1, 8.1.1) to the radio distribution unit. Afterwards, further messages are once again transmitted between the radio base station RBS3 and the radio network termination $RNT_i$ until the radio network termination $RNT_i$ sends a MAC message "CONNECTION_CONFIRM" CCF (cf. ETSI Publication ETS 300175-3, October 1992, Chapter 8, 8.1, 8.1.1) to the subscriber station. The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling setting up of telecommunication connections in telecommunication subsystems serving as local message transmission loops of telecommunication systems and having network terminations which differ with regard to the transmission channel requirements, comprising the steps of:

a) transmitting system messages on system channels in the telecommunication systems;

b) providing the telecommunication subsystems with a plurality of subsystem channels for transmitting subsystem messages and the system messages;

c) providing the telecommunication subsystems with telecommunication interfaces, which are connected via network termination-specific subsystem channels to second telecommunication interfaces and/or third telecommunication interfaces, which are structured as network terminations, and also via network-specific subsystem channels to the system channels;

d) incorporating the telecommunication subsystems into the telecommunication systems via the telecommunication interfaces;

e) providing the network termination-specific subsystem channels with signalling channels and user data channels;

f) transmitting the messages from and to the second telecommunication interfaces via the signalling channels and/or the user data channels, and transmitting the messages from and to the third telecommunication interfaces via the user data channels;

g) transmitting first subsystem messages having first parameters from the second telecommunication interfaces and/or the third telecommunication interfaces to the first telecommunication interfaces, for connection setting up;

h) transmitting the first parameters of the first subsystem messages having first parameter values containing contents "SIGNALLING CHANNEL ONLY" from the second telecommunication interfaces to primary telecommunication interfaces of the first telecommunication interfaces;

i) connecting the signalling channels to first channels of the network-specific subsystem channels for connecting the signalling channels to the system channels and/or for routing of the signalling channels of the telecommunication subsystem to the telecommunication systems.

2. The method according to claim 1, wherein a number of first channels is limited.

3. The method according to claim 2, wherein as a response t the first subsystem messages having the first parameters and the first parameter values, second subsystem messages having second parameters and second parameter values containing contents "PRIMARY TELECOMMUNICATION INTERFACE BUSY" are transmitted from the primary telecommunication interfaces to the second telecommunication interfaces when the first channels are all busy.

4. The method according to claim 3, wherein the first parameters of the first subsystem messages having the first parameter values are transmitted from the second telecommunication interfaces to secondary telecommunication interfaces of the first telecommunication interfaces when the second telecommunication interfaces receive the second subsystem messages having the second parameters and the second parameter values.

5. The method according to claim 4, wherein the first parameters of the first subsystem messages having the first parameter values are transmitted from the second telecommunication interfaces to the first telecommunication interfaces until the second telecommunication interfaces receive third subsystem messages having the first parameters and the first parameter values.

6. The method according to claim 1, wherein the telecommunication system is an ISDN system and PSTN system.

7. The method according to claim 1, wherein the telecommunication subsystem is a DECT system.

8. The method according to claim 1, wherein the telecommunication subsystem is a GSM system.

9. The method according to claim 1, wherein the telecommunication subsystem is one of a PHS system, a WACS system or a PACS system.

10. The method according to claim 1, wherein the telecommunication subsystem is one of an "IS-54" system or a PDC system.

11. The method according to claim 1, wherein the telecommunication subsystem is one of a CDMA system, a TDMA system, an FDMA system or a, with regard to the said transmission standards hybrid system.

12. The method according to claim 1, wherein the first telecommunication interface is a DECT/GAP-specific radio base station, the second telecommunication interface is a DECT-specific radio network termination with ISDN capability, and the third telecommunication interface is a DECT-specific radio network termination which is structured for n-fold data transmission.

13. The method according to claim 7, wherein the first subsystem messages are DECT-specific "MAC protocol layer" messages "BEARER_REQUEST", the first parameters are DECT-specific "MAC protocol layer" parameters "SERVICE TYPE", the first parameter values having the contents "SIGNALLING CHANNEL ONLY" are DECT-specific "MAC protocol layer" parameter values "$C_f$-CHANNEL ONLY", the second subsystem messages are DECT-specific "MAC protocol layer" messages "RELEASE", the second parameters are DECT-specific "MAC protocol layer" parameters "RELEASE REASON", the second parameter values having the contents "PRIMARY TELECOMMUNICATION INTERFACE BUSY" are DECT-specific "MAC protocol layer" parameter values "RADIO BASE STATION BUSY", and the third subsystem messages are DECT-specific "MAC protocol layer" messages "BEARER_CONFIRM".

14. The method according to claim 4, wherein the telecommunication subsystem is a DECT system.

* * * * *